(12) United States Patent
Facius et al.

(10) Patent No.: US 7,976,165 B2
(45) Date of Patent: Jul. 12, 2011

(54) IMAGE GENERATION UNIT AND IMAGE PROJECTION DEVICE

(75) Inventors: Zoltan Facius, Waiblingen (DE); Evangelos Zoidis, Waiblingen (DE)

(73) Assignee: SONY Deutschland GmbH, Cologne (DE)

(*) Notice: Subject to any disclaimer, the term of this patent is extended or adjusted under 35 U.S.C. 154(b) by 571 days.

(21) Appl. No.: 10/584,056

(22) PCT Filed: Dec. 20, 2004

(86) PCT No.: PCT/EP2004/014504
§ 371 (c)(1), (2), (4) Date: Oct. 12, 2007

(87) PCT Pub. No.: WO2005/064949
PCT Pub. Date: Jul. 14, 2005

(65) Prior Publication Data
US 2008/0062519 A1 Mar. 13, 2008

(30) Foreign Application Priority Data
Dec. 23, 2003 (EP) .................................... 03029805

(51) Int. Cl.
*G03B 21/00* (2006.01)

(52) U.S. Cl. ............................................. 353/20; 353/33
(58) Field of Classification Search .................... 353/81, 353/85, 20; 349/7, 8–10; 348/791–794
See application file for complete search history.

(56) References Cited

U.S. PATENT DOCUMENTS

| | | |
|---|---|---|
| 5,042,921 A | 8/1991 | Sato et al. |
| 2001/0030779 A1 | 10/2001 | Ho |
| 2002/0080333 A1 | 6/2002 | Lee |
| 2003/0071974 A1 | 4/2003 | Inoue |
| 2003/0223044 A1* | 12/2003 | Janssen ........................ 353/20 |
| 2004/0145703 A1* | 7/2004 | O'Connor et al. ............. 353/20 |

FOREIGN PATENT DOCUMENTS
EP 1 063 852 12/2000
* cited by examiner

*Primary Examiner* — Que T Le
*Assistant Examiner* — Jerry Brooks
(74) *Attorney, Agent, or Firm* — Oblon, Spivak, McClelland, Maier & Neustadt, L.L.P.

(57) ABSTRACT

An image generation unit with a geometry according to which a light input section and a light output section are formed and/or are arranged such that a light incidence axis or direction and an image emission axis or direction are essentially collinear, parallel, or coincident with respect to each other.

14 Claims, 7 Drawing Sheets

IMAGE GENERATION UNIT AND IMAGE PROJECTION DEVICE

The present invention relates to an image generation unit, in particular for an image projection device, or the like, and to an image projection device utilizing the inventive image generation unit.

Nowadays, image displaying and image projecting techniques become more and more popular and important, in particular in electronic appliances and equipment for information exchange and display.

As the process of miniaturization is a major task in the further development of known electronic appliances and equipment, there is a need for miniaturized devices for generating images and/or for displaying images.

Image generation units and image projection devices known in the art possess comparable complicated optical paths and working principles for generating and for displaying/projecting images.

It is an object of the present invention to provide an image generation unit and an image projection device which are capable of reliably generating and projecting images and which at the same time consume a reduced space and possess simplified optical paths and image generation/projection means.

The object is achieved by an image generation unit according to the present invention with the characterizing features of independent claim 1. Additionally, the object is achieved by an image projection device according to the present invention with the characterizing features of independent claim 12. Preferred embodiment are within the scope of the respective dependent claims.

Known image generation units, in particular for image projection devices, or the like, comprise a light input or light incidence surface or section, an image generation element and a light output or light emission surface or section. The light input or light incidence surface or section is arranged and/or adapted for receiving primary illumination light essentially along or from a first or light incidence axis or direction. The image generation element arrangement is arranged and/or adapted for producing an image receiving and by using said primary illumination light or a part or a derivative of said primary illumination light. Thereby, secondary illumination light or image light is generated. Finally, said light output or light emission surface or section is adapted for emitting secondary illumination light or a part or derivative of said secondary illumination light as tertiary illumination light or projection light. Said tertiary illumination light or said projection light is representative for said image and emitted essentially along or in the direction of the second light or image out/emission axis/direction.

An inventive image generation unit is characterized in that said light input or light incidence surface or section and said light output or light emission surface or section are formed/or are arranged in a manner that said first or light incidence axis or direction and said section or image emission axis or direction are either collinear or essentially collinear, parallel or essentially parallel, or coincident or essentially coincident with respect to each other.

It is therefore a key idea of the present invention to arrange the components of an image generation unit in a manner that the axes, directions, or the like, of the incoming light and of the outgoing light are the same or are comparable. Therefore, the image generation unit and the image projection device using the same are built up essentially in one dimension, i.e. essentially along a single section or along a single direction. Consequently, the inventive image generation unit occupies a reduced or limited portion of space only and is therefore characterized by a space-saving arrangement.

This is a strict contrast and contradiction to prior art arrangements where the light input axis and the light output axis have a comparable large angle of inclination, in general of about 90°. Therefore, prior art systems occupy in general two dimensions in space, as they are not aligned essentially along a single direction or axis.

The light input and output direction is coincident. This could be also achieved by placing three folding mirrors on a standard 90°-single imager system, but will require more space. A PCS-cube is used as a kind of folding mirror and also as light analyzer in one time to keep the ingoing and outgoing light path coincident. Further the reflective electronic color switch is not a standard product. It is special (key) part and can only be used in this configuration. This special configuration (placement of parts around the cube) allows shortening the light path.

There exist a variety of concrete realizations according to the present invention for obtaining coinciding input and output axes or directions. These realizations strongly depend on the different components or optical elements which are involved.

According to a preferred embodiment of the image generation unit a polarization selective beam splitting device is provided which has a light input surface or section serving as said light input or light incidence surface or section of said image generation unit or as a part thereof. Additionally, said polarization selective beam splitting device comprises a light output surface or section serving as said light output or light emission surface or section of said image generation unit or as a part thereof.

Additionally or alternatively, the inventive image generation unit comprises a beam splitting cube as said polarization selecting beam splitting device or as a part thereof. Such a polarization beam splitting cube may in this case comprise a first pair of opposing surfaces/sections each of which serving as said light input or light incidence surface or said image generation unit and as said light output or light emission surface or section of said image generation unit, respectively, or as a part thereof.

The polarization selective beam splitting device comprises a polarization selective beam splitting interface which is adapted to reflect light of a first or s-polarized polarization state and which is adapted to transmit light of a second or p-polarized polarization state. According to this measure, incident light can be split up into two components which are complementary with respect to each other with respect to their polarization states.

According to a further advantageous embodiment of the present invention, said image generation element arrangement of the inventive image generation unit or the elements or the parts thereof may be positioned outside a path or passage defined by said first and second axes or directions and/or outside said polarization selective beam splitting device or its polarization selective beam splitting interface.

Further, additionally or alternatively, said image generation element arrangement may comprise an imager panel element, in particular a reflective imager panel which is adapted to controllably generate an image. This imager panel element may be in the form of a LCD-panel.

According to a further preferred embodiment of the present invention, said image generation element arrangement may comprise a reflective arrangement, in particular a mirror which is adapted and/or arranged to receive light reflected by said polarization selective beam splitting interface and to reflect said received light back, thereby changing its polarization state from p to s and/or from s to p, respectively.

A further advantageous and preferred embodiment of the inventive image generation unit is characterized in that said image generation element arrangement comprises a color-switching element which is adapted to controllably transmit at least one first spectral component of incident light and to essentially avoid the transmission of the complementary spectral range of said at least one first spectral range. According to this particular measure a colored display can be realized, for instance in a color-sequential mode.

Regarding the position of the display and the color-generating unit (RECS) two scenarios are possible. The position of both can be exchanged. So that in one setup the light comes first to the color generating unit and than guided to the display (imager) or first reaching the display and than going to the RECS.

It is of further advantage in this case that said switching-switching element is or comprises a quarter wave retarder and/or a reflective electronic color switch.

In a preferred embodiment of the present invention the image generation unit is adapted and arranged in a way that said imager panel element, on the one hand, and said reflective arrangement together with said color switching element, on the other hand, are arranged or positioned at or in opposing sections, areas or surfaces of said image generation unit and in particular of said polarization selective beam splitting device, which are in particular different from said light input or light incidence surface or section and said light output or light emission surface or section of said image generation unit, and further which are in particular which are different from said light input surface or section and said light output surface or section of said polarization selective beam splitting device.

In this particular arrangement it is of further advantage, if said opposing sections, areas or surfaces of said image generation unit and in particular of said polarization selective beam splitting device are essentially perpendicular oriented with respect to said light input or light incidence surface or section and said light output or light emission surface or section of said image generation unit and in particular with respect to said light input surface or section and said light output surface or section of said polarization selective beam splitting device.

It is a further aspect of the present invention to provide an image projection device which comprises an illumination unit which is arranged and/or adapted for generating primary illumination light, an image generation unit which is arranged and/or adapted to receive said primary illumination light and to generate and emit an image and a projection unit which is arranged and/or adapted to receive and project said image.

According to the present invention said inventive image projection device comprises an image generation unit, which is arranged and formed according to the present invention.

These and further aspects of the present invention are explained in other words by taking reference to the following remarks:

It is an issue of the present invention to provide a compact projection unit, a compact optical engine or the like based in particular based on a single reflective micro display.

According to an inventive solution this may be achieved by a particular simple design for compact and high efficient unit for a micro display based projection unit or the like. Only one or a single beam splitter surface is involved for performing a threefold optical interaction, i.e. it is involved three times and the surface is hit three times by the light. The new and inventive architecture is used for illuminating micro displays with polarized color light. The architecture is simplified in a way that the optical axes are not turned at 90°, so that that projection unit obtains a shape of a post or a rod.

Some major aspects of the present invention can be seen in:
the development of an compact projection device of unfolded, rod like shape using new splitting architecture,
the development of a new component like a reflective electronic color switch or RECS, and
the reduction of the costs and size by keeping a suitable optical performance of the system, e. g. with respect to contrast.

The compact and tall-shaped system is developed for special application where the direct space beside the projection system is required for other devices/instruments. Thinkable applications are possible in the field of avionics, car-dashboards in home augmented environments.

Generally, known systems are consist of an illumination part, a single polarizing beam splitter or PBS plate or cube in front of the reflective imager device, and a projection unit producing a magnified image of the imager device onto a screen. Components or subsystems for generating the color time sequentially or spatially separated, are working mostly serial in transmission.

Current systems use the polarizing beam splitter cube in a standard configuration. P- or S-polarized light is transmitted (P) or reflected (S) onto the display and the modulated light for projecting is reflected or transmitted in direction of the projection lens. The not modulated light keeps its polarization and is transmitted or reflected backwards into the illumination system. By passing the polarizing selective surface only once. This requires that the optical axes of illumination and projection have to be folded. Usually 45° polarizing beam splitters are used, that's why the optical axes are turned on 90° or on a certain angle greater than 0°.

Different systems and optical engine architectures without polarizing beam splitters are often referred to as OFF-Axis architectures.

The polarizing beam splitter is placed in such a way that the incoming, useful S-polarized light from illumination system is first reflected to a mirror placed behind an electronic color-switching device. There, the useful colors are reflected back by with a turned state of polarization. The colors R, G and B are generated in time sequential mode. Each color turns its polarization state once in a period. The color with turned polarization state is now in P-polarization and reflected back to the polarizing beam splitter cube. Here the color is transmitted towards the display or imager panel, which is placed on the opposite side of beam splitter. Here the light is modulated regarding the electronic image information of the display or imager panel.

Light, which has to leave in direction to the projection unit or lens and the screen will be modulated by the display or imager panel and changes again its polarization state to S-polarized light. This light is reflected by the beam splitter surface towards the projection lens and projected onto the screen (ON-state).

Light, which is not modulated keeps its polarization state. This light is reflected by the display or imager panel, transmitted by the beam splitter cube and directed onto the mirror stacked with the color-switching device. The polarization state is changed back to S-polarized light. The light is then reflected back onto the polarization selective beam splitting surface. There, it is reflected back into the illumination unit (OFF-state).

Mainly the beam splitter, one absorptive polarizer and analyzer achieve the high contrast of the system. Where incoming S-polarized light is reflected by more than 99%. The analyzer will absorb wrong P-polarized light (P-wrong), which is not absorbed by the polarizer. Unfortunately S-polarized light that is not reflected by the beam splitter will leave the system towards the projection unit. This light (S-wrong) is weak, less than 1% of the S-polarized light.

If the incoming light should be not polarized, the configuration would only have a transmission of less than 0.1% for P-polarized light. Further, the incident light on the panel is p-polarized. This polarization has a high degree of polarization. Because of the nature of polarizing beam splitter that mainly all S-polarized light is reflected.

First objective is that the incoming S-polarized light is not directly reflected onto the display. The display receives only P-polarized light reflected by the mirror stacked with color-switching unit or at least a quarter wave retarder. Display and mirror and color-switch or quarter wave retarder are positioned on opposite sides of the polarizing beam splitter cube looking to each other. They are lying parallel to the main optical axis of illumination and projection light path.

Second objective is that the light path of projection and the illumination lies on the same optical axis, therefore we call it unfolded optical system.

In the following the modulation concept is explained:

As mentioned in the idea above a system for generating the color time sequentially is stacked on the side of the cube. The working principle is similar to a mirror stacked with a quarter wave plate. In our example the S-polarized light, reflected by the beam splitter, is turned in to P-polarized light, which is reflected back to the beam splitter and onto the display.

To generate colors only a part of light spectra is turned and reflected. These color selective function achieved by using cholesteric polarizer in addition to the quarter wave retarder. If these cholesteric polarizer has a tunable retardation for several wavelength by adding a liquid crystal cell we can produce more than one color. This kind of reflective electronic color switch or RECS is working in time sequential mode.

Usually electronic switched color filters are positioned in front of the cube almost in telecentrical part of the illumination system for use in single transmission. The light passes the color filter where the polarization stage of one part of the incoming spectrum is turned. The working principle is like a half wave retarder for special wavelength.

Some advantages of the present invention are:
- a higher light contrast as in conventional systems in particular by using a single beam splitting surface three times instead of two times,
- a new topology for color managing in reflective applications,
- a less amount of components and therefore reduced weights and sizes,
- lower manufacturing costs, and
- new format ratios of housings and therefore the possibility of new application areas.

Figure 3:
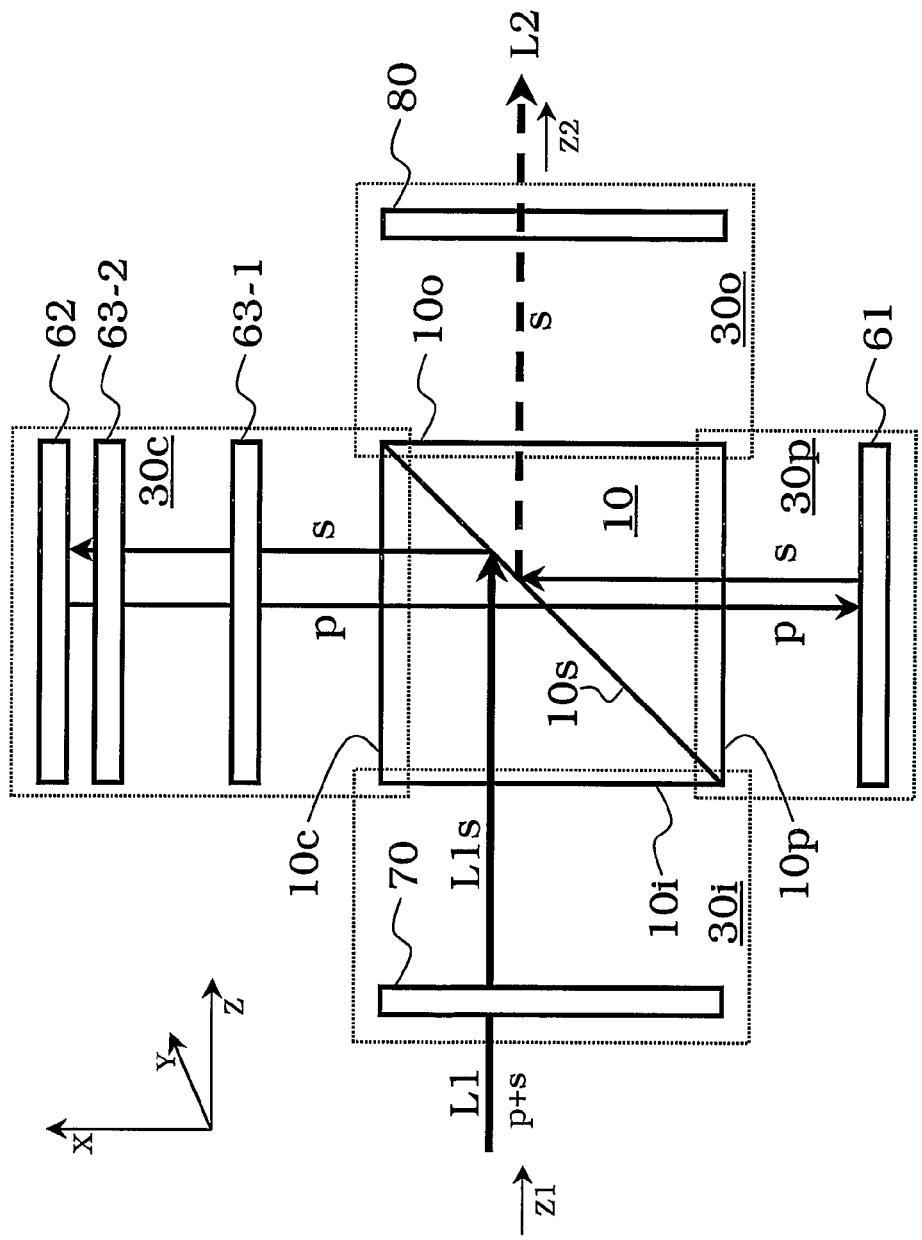

FIG. 3 demonstrates in more detail by means of a schematical and cross-sectional top view an embodiment of the image generation unit according to the present invention.

Figure 4:
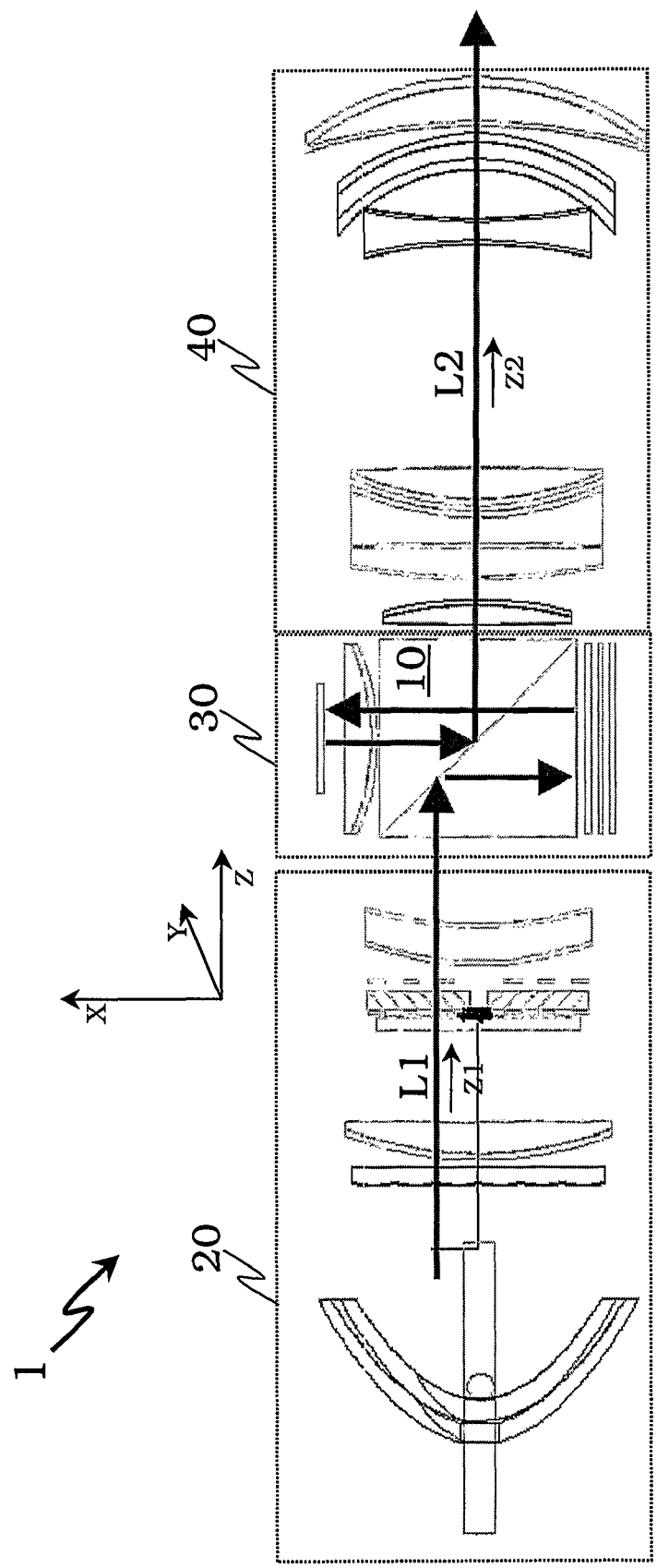

FIG. 4 is a schematical and cross-sectional side view of an embodiment of the inventive image projection device comprising an embodiment of the inventive image generation unit.

Figure 5:
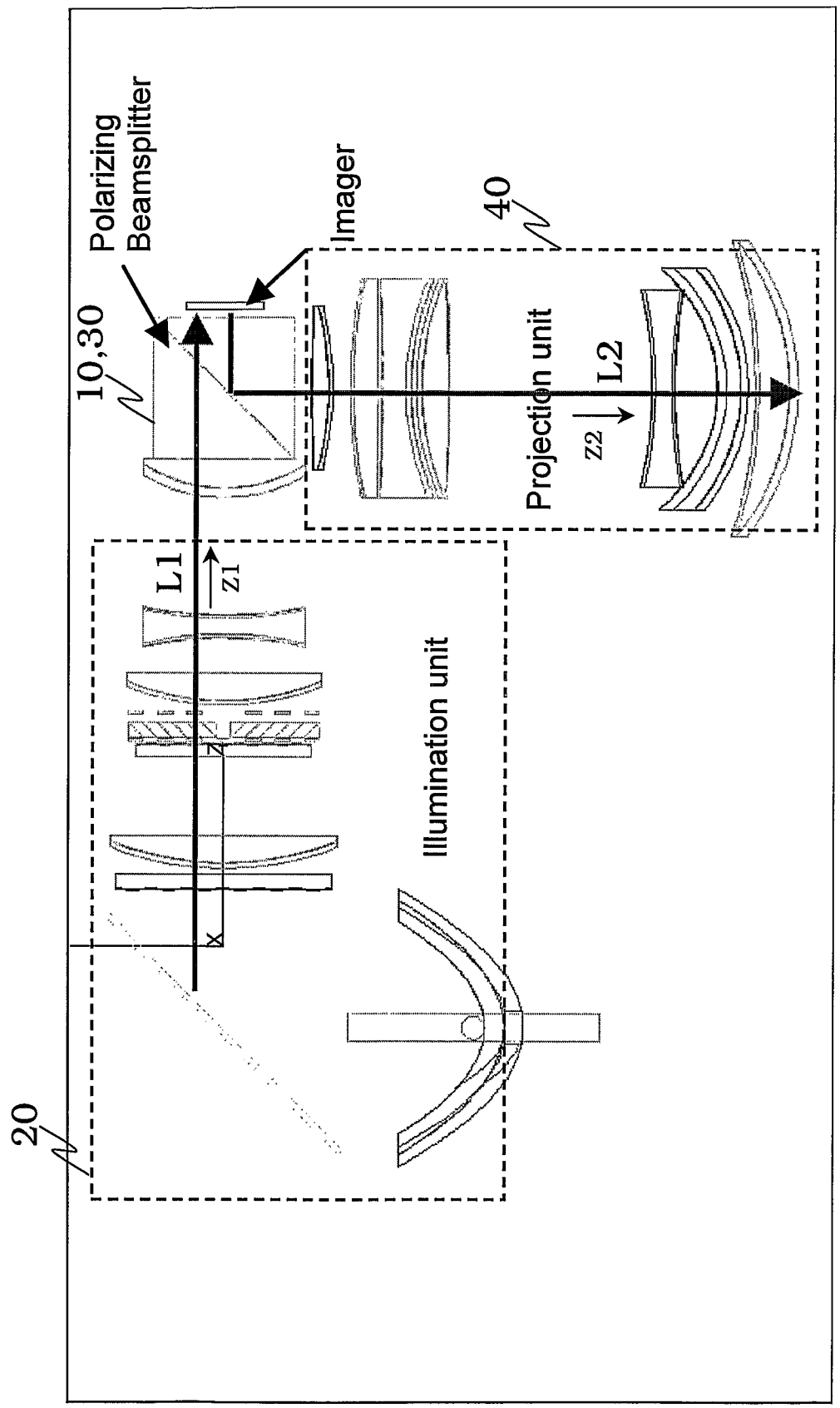

FIG. 5 demonstrates by means of a cross-sectional and schematical side view in more detail features of a conventionally designed image projection device comprising a conventionally designed image generation unit.

Figures 6A, 6B:
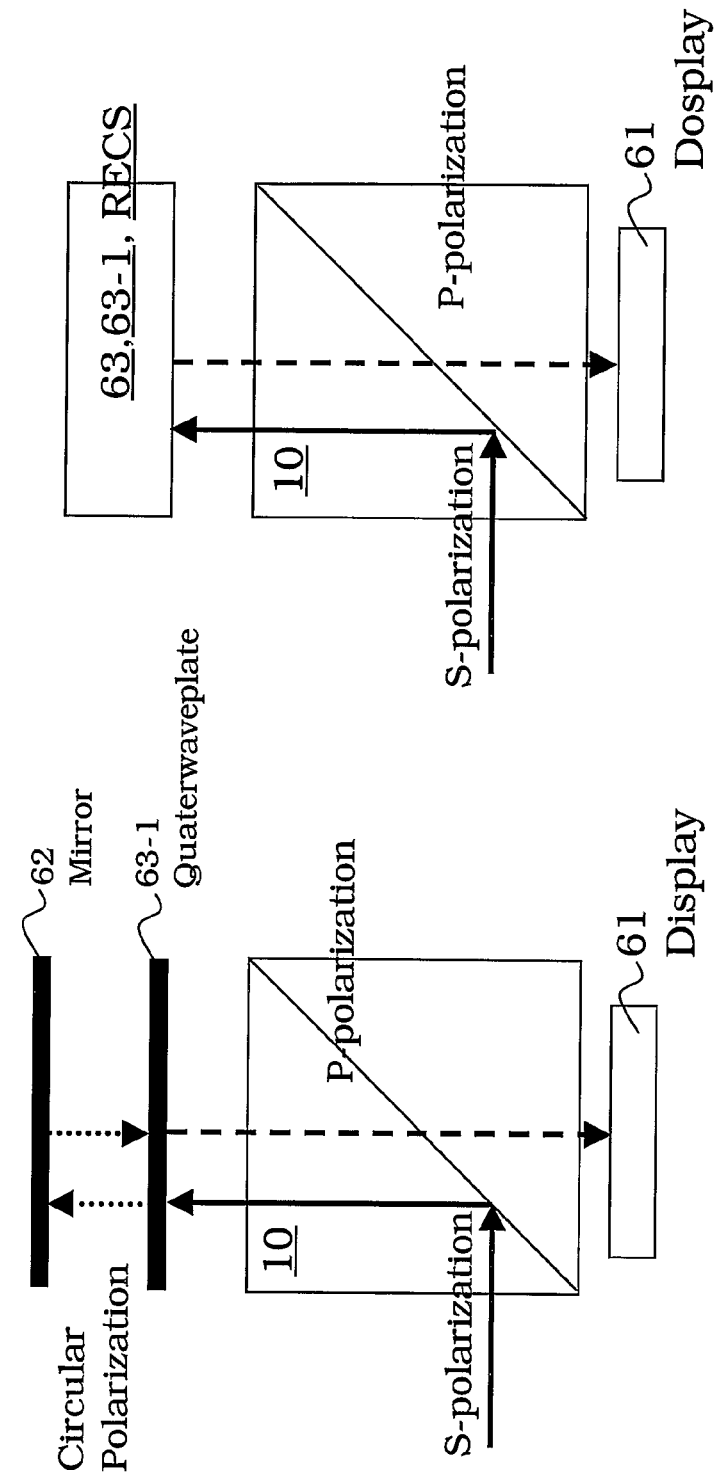

FIGS. 6A, 6B demonstrates details of two further embodiments of the present invention.

Figure 7:
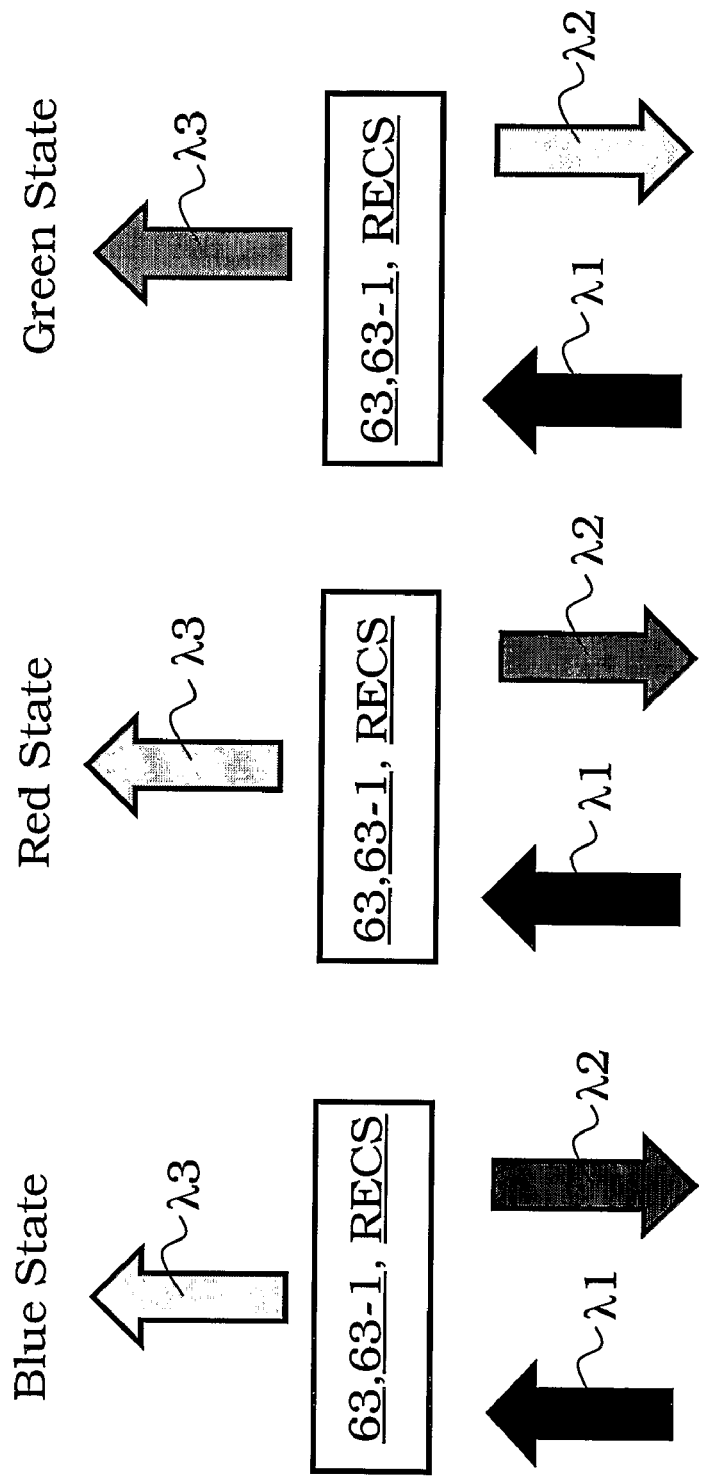

FIG. 7 demonstrate some details of the working principle of a RECS.

Figure 1:
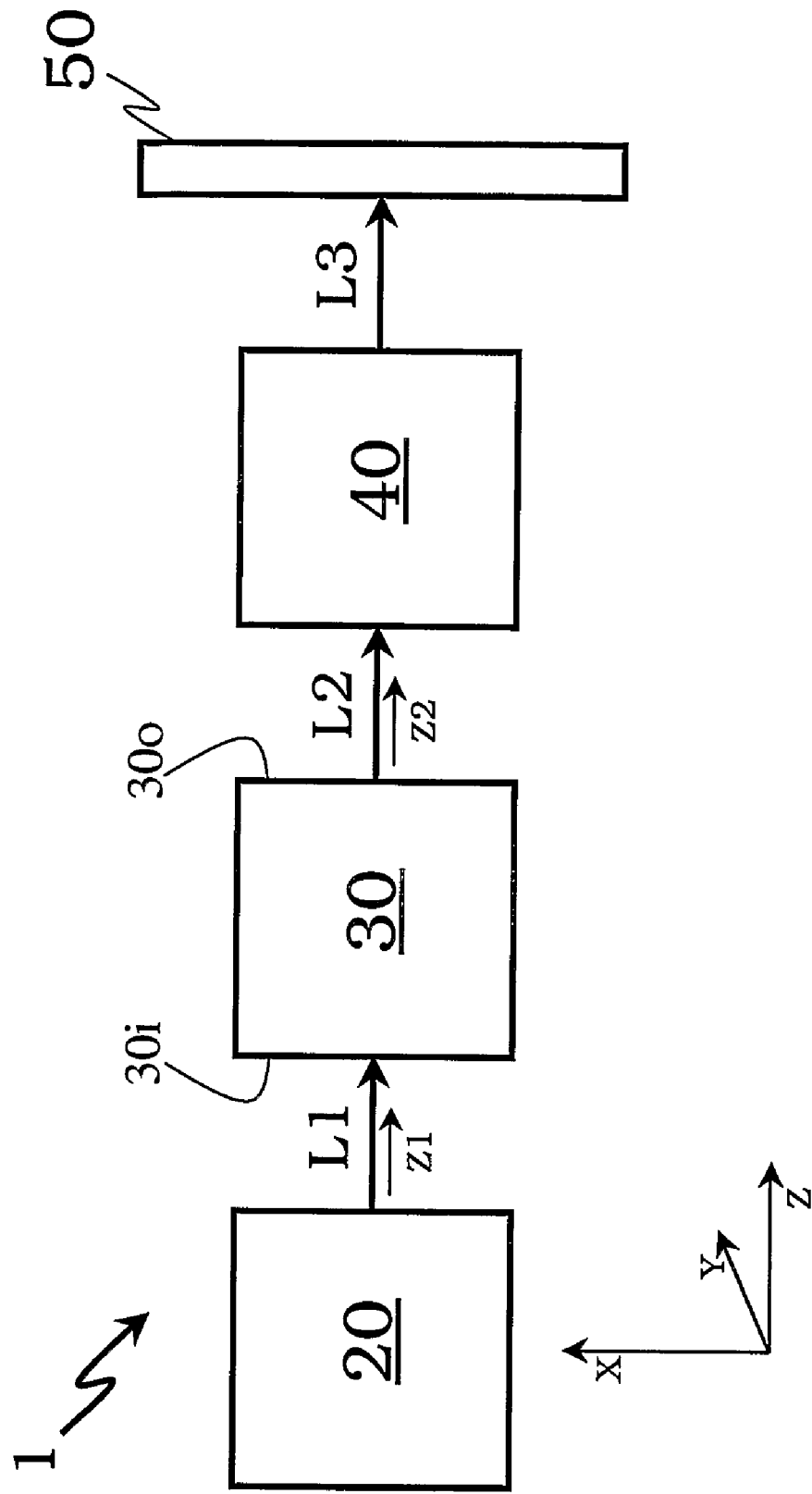
FIG. 1 is a schematical block diagram elucidating the basic principles behind the inventive image generation unit and the inventive image projection device.

FIG. 1 demonstrates by means of a schematical block diagram basic properties of the image projection device 1 according to the present invention and comprising an embodiment of the image generation unit 30 according to the present invention.

The general embodiment of the image projection device 1 according to the present invention comprises first of all an illumination unit 20 which is designed and adapted to generate primary illumination light L1 and to emit said primary illumination light L1 in a certain direction Z1 or along a certain axis Z1. The embodiment of the inventive image generation unit 30 is arranged to receive said primary illumination light L1 from said certain direction Z1 or certain axis Z1. Therefore, the certain direction Z1 is also called light input or light incidence direction Z1 or axis Z1. Consequently, said received primary illumination light L1 enters the image generation unit 30 according to the present invention through a given light input or light incidence section 30i or surface 30i.

The inventive image generation unit 30 is adapted to use said received primary illumination light L1 so as to produce an image. Therefore, secondary illumination light L2 or image light L2 is generated and emitted by said image generation unit 30 through a light output or light emission section 30o or surface 30o which is directly opposing said given light input or light incidence section 30i or surface 30i.

Said secondary illumination light L2 or image light L2 is emitted in a second or light output or light emission direction Z2 or along a second or light output or light emission axis Z2 which is coincident to said first or light or input/incidence direction/axis.

It is a basic aspect of the present invention to have an arrangement of a light input or light incidence section/surface 30i and the light output or light emission section/surface 30o with respect to each other in a way that said first or light input or light incidence direction/axis Z1 and said second or light output or light emission axis/direction Z2 are arranged with respect to each other in a collinear or essentially collinear, parallel or essentially parallel, or coincident or essentially coincident manner. In the example of FIG. 1 the directions/axes Z1 and Z2 are strictly coincident with respect to each other.

According to the present invention the inventive image projection device 1 comprises a projection unit 40 in particular having an optical arrangement to receive said secondary illumination light L2 or a derivative thereof which is in each case representative for the image generated by the inventive image generation unit 30. The projection unit 40 itself optically transforms the received secondary illumination light L2 and therefore the received image to produce tertiary illumination light L3 or projection light L3 which is then sent or emitted to a display device 50 or screen 50 to display the produced image.

Figure 2:
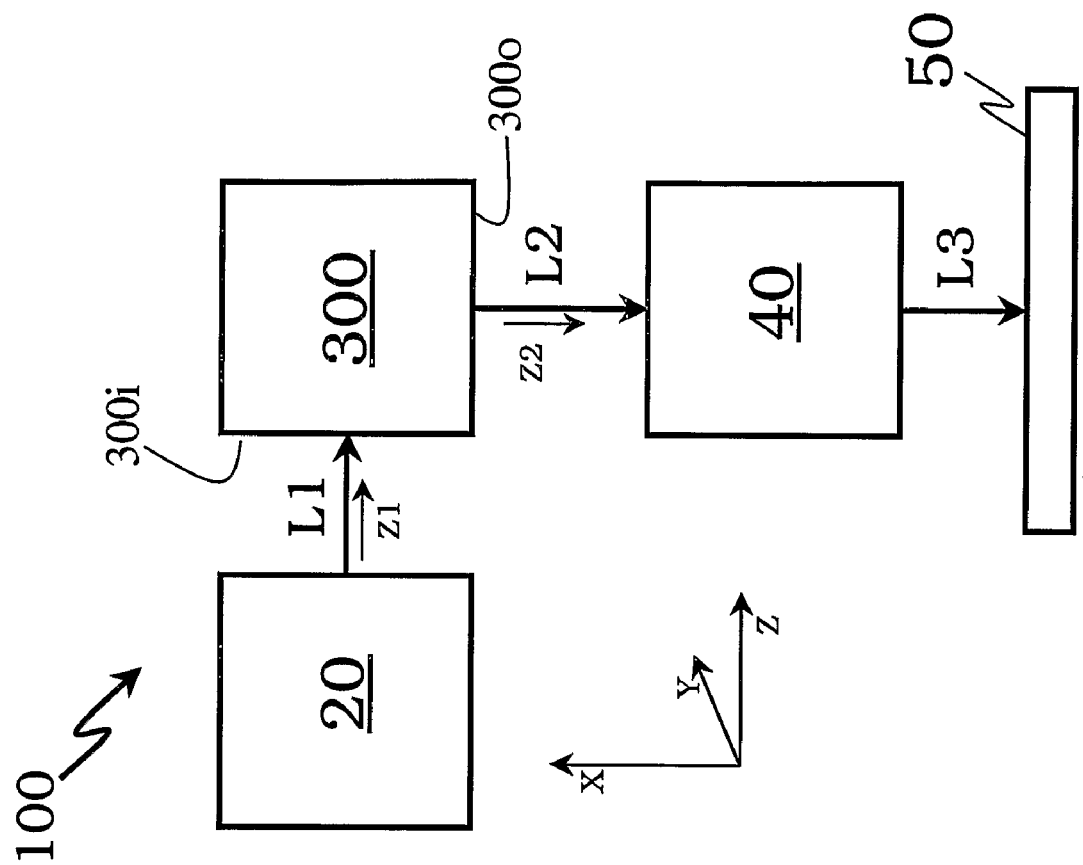
FIG. 2 is a schematical block diagram of a conventional image generation unit and a conventional image projection device.

FIG. 2 shows in a comparable way by means of a schematical block diagram aspects of a conventionally designed image projection device 100 comprising a conventionally designed image generation unit 300. In contrast to the inventive design of an image projection device 1 and the inventive image generation unit 30 and a conventionally designed structure, an OFF-axis design is demonstrated, i.e. the first or light input/incidence axis/direction Z1 of the primary illumination light L1 and the second or light output/emission axis/direction Z2 of said secondary illumination light L2 being representative for the image to be projected are not arranged or designed to be collinear or essentially collinear, parallel or essentially parallel, or coincident or essentially coincident with respect to each other. The reason for that is that the light input/incidence section/surface 300*i* and the light output/emission section/surface 300*o* are not in a directly opposing arrangement with respect to each other, but in the Example of FIG. 2 they are essentially perpendicular oriented with respect to each other so that the direction of the traveling light is changed from Z1 for L1 to Z2 for L2 when producing and outputting the image by the conventional image generation unit 300.

FIG. 3 is a cross-sectional top view of an embodiment of the inventive image generation unit 30. A major part of the inventive image generation unit 30 is a polarization selective beam splitting device 10 in the form of a polarization selective beam splitting cube 10. This polarization selective beam splitting device 10 or cube 10 comprises a light input/incidence section/surface 10*i* and a directly opposing and parallely aligned output/emission section/surface 10*o*. The light input/incidence surface/section 10*i* of the inventive image generation unit 10 at least partly forms the light input/incidence section/surface 30*i* of the image generation unit 30. The light output/emission section/surface 10*o* of the polarization selective beam splitting device 10 or cube 10 at least partly forms a light output/emission section/surface 30*o* of the image generation unit 30 according to the present invention.

The first or light input/incidence section/surface 10*i* and the second or light/image output/emission section/surface 10*o* of the inventive image generation unit 10 on the one hand and the first or light input/incidence section/surface 30*i* and the second or light/image output/emission section/surface 30*o* of the inventive image generation unit 30 respectively form first pairs of section/areas/surfaces 10*i*, 10*o*, 30*i*, 30*o* for said inventive image generation unit 10 and for said inventive image generation unit 30, respectively.

The polarization selective beam splitting device 10 or cube 10 also comprises a second pair of sections or surfaces 10*p* and 10*c* which are different from the first pair of sections or surfaces 10*i* and 10*o* and which are also directly opposing with respect to each other. This further pair of sections or surfaces 10*p* and 10*c* accordingly forms a second pair of sections or surfaces 30*p* and 30*c*, respectively, for the image generation unit 30 of the present invention which is different from the first pair of sections or surfaces 30*i* and 30*o* of the image generation unit 30. In the situation shown in FIG. 3, the first pair of sections or surfaces 30*i*, 30*o* and 10*i*, 10*o* is perpendicularly oriented with respect to the second pair of sections or surfaces 30*p*, 30*c* and 10*p*, 10*c*, respectively.

The first section or surface 30*p* of the second pair contains an imager panel element 61 of the reflective type, for instance in the form of an LCD-panel element, or the like. Additionally, the first section/surface 10*p* of the second pair of the beam splitting device or cube 10 forms at least a part of said first section/surface 30*p* of the second pair of the image generation unit 30.

In opposing relation thereto the second section/surface 30*c* of the second pair of the image generation unit 30 contains as further elements of the image generation element arrangement 60 a color-switching device 63 comprising a quarter wave retarder 63-1 and a reflective electronic color-switching element or RECS 63-2, and finally a reflective arrangement 62 in the form of a mirror 62. Also, the second section or surface 10*c* of the second pair of the beam splitting device or cube 10 forms at least a part of the second section or surface 30*c* of the second pair of section, areas, surfaces of the inventive image generation unit 30.

In the following the working principle of the inventive image generation unit 30 will be explained taking reference to the function of the embodiment shown in FIG. 3.

Primary illumination light L1 enters the image generation unit 30 of FIG. 3 via its light input/incidence section/surface 30*i*. Said primary illumination light L1 may be referred to as a superposition of a S-polarized component a P-polarized component. Generally, only one of the polarization components is used for the generation of an image. In the case of the embodiment of FIG. 3, the S-polarized component of the primary illumination light L1 is chosen. To decompose the superposition of said primary illumination light L1, the P-polarized component of such primary illumination light L1 can be absorbed or reflected within the light input/incidence section/surface 30*i*. In the case of the embodiment of FIG. 3 said light input/incidence section/surface 30*i* additionally comprises a polarizer 70 by means of which said primary illumination light L1 is completely turned into a S-polarized polarization state.

The S-polarized primary illumination light L1s is then transmitted through the light input/incidence section/surface 10*i* of the polarization selective beam splitting device 10 or cube 10 and then transmitted towards the polarization selective beam splitting interface 10*s* of said polarization selective beam splitting device 10 or cube 10 which is tilted by an angle of 45° against the first or light input/incidence axis/direction Z1 so as to reflect the s-polarized primary illumination light L1s into an Off-axis direction X towards the second section/surface 10*c* and 30*c* of the second pair of sections/surfaces of the polarization selective beam splitting device 10 or cube 10 and the inventive image generation unit 30 of FIG. 3.

The reflected S-polarized primary illumination light L1s is then still in the S-polarized polarization state and passes through a color selection arrangement 63 comprising a quarter wave retarder 63-1 and a reflective electronic color switch 63-2 which are also contained in the second section/area 30*c* of the second pair of sections/areas of the inventive image generation unit 30 of FIG. 3.

The selected color passes through the color selection arrangement 63 and is the reflected upon incidence onto a reflective arrangement 62 or mirror 62 also contained in the second section/surface 30*c* of the second pair of surfaces/sections of the inventive image generation unit 30.

Upon reflection the polarization state of the reflected light is turned into the P-polarized polarization state and reflected towards the polarization selective beam splitting interface 10*s*. Upon incidence onto said polarization selective beam splitting interface 10*s* the P-polarized and color selected light is transmitted to the first section/surface 10*p* and 30*p* of the second pair of sections/surfaces of a polarization selected beam splitting device 10 or cube 10 and the inventive image generation unit 30 which is directly opposed to said second section/surface 10*c*, 30*c* and parallely oriented thereto.

The first section/surface 30*p* of the second pair of sections/surfaces of the inventive image generation unit 30 also contains an imager panel arrangement 61, for instance in the form of a reflective LCD-panel as a further element of the image generation element arrangement 60.

Upon incidence onto active areas of the imager panel element 61 the incident P-polarized color selected light is turned into the S-polarized polarization state which is also called the ON-state and then reflected back to the polarization selective beam splitting interface 10s, where it is again reflected in a direction Z2 for the secondary illumination light L2 which is essentially parallel to the direction Z1 of the incident primary illumination light L2.

For filtering out eventually contained P-polarized light in the light output/emission section/surface 30o of the first pair of sections/surfaces of the inventive image generation unit 30, additionally an analyzer 80 is contained which transmits S-polarized light components and which absorbs or reflects P-polarized components.

In contrast, p-polarized color-selected light incident onto non-active areas of the imager panel element 61 is reflected without being changed with respect to its polarization state. The p-polarized light component therefore is transmitted through the polarization selective beam splitting interface 10s, falls onto the reflective arrangement 62 or the mirror 62 again, upon said reflection its polarization state is turned into s-polarized polarization state, then reflected back to the polarization selective beam splitting interface 10s and upon incidence onto said polarization selective beam splitting interface 10s back to the origin of the primary illumination light L1.

FIGS. 4 and 5 demonstrate in more detail the structures and elements already shown in FIGS. 1 and 2.

FIG. 4 shows a detailed example rod like projection engine.

In this example the light is guided first to the color generating unit and than to the imager. Also the imager is the only part in the telecentric light path of the system.

This will cause a slightly reduction in contrast, because the polarizing beam splitter works more properly in a telecentric light, but due to compactness of the design this configuration was chosen.

With symbol 20 the illumination part is denoted with lamp and reflector, first and second lens array, polarizing converting system, main condenser lens. With symbol 30 the assembly of imager, field lens, reflective electronic, color switch and polarizing beam splitter cube are denoted with attached polarizers at sides 1 and 2.

FIG. 5 shows a state of the art system with 90° tilted optical axis.

In this case the transmissive color switch or a color wheel known from DLP-projectors are used for color generating.

FIGS. 6A and 6B demonstrate more concrete realizations of a quarter wave retarder and of a reflective electronic color switch, respectively, how they work and how they can be controlled.

It is meant that the function is comparable to a mirror plate with a quarter wave retarder (FIG. 6A) in front with its first axis turned on 45°. The only difference the color switch can select the reflective wavelength band.

Two possible configurations are covered: a reflective color switch working in front of the display and sending back and for redirecting the beam and turning polarization state.

The working principle of a reflective color switch is described in FIG. 7.

REFERENCE SYMBOLS

1 Inventive image projection device
10 Polarization selective beam splitting device, polarization selective beam splitting cube
10c Surface, section, area of polarization selective beam splitting device for color selection
10i Light input/incidence surface/section of polarization selective beam splitting device
10o Light output/emission surface/section of polarization selective beam splitting device
10p Surface, area, section of polarization selective beam splitting device for imager panel/image generation
10s Polarization selective beam splitting interface of polarization selective beam splitting device
20 Illumination unit
30 Inventive image generation unit
30c Surface, section, area image generation unit of image generation unit for color selection
30i Light input/incidence surface/section of image generation unit
30o Light output/emission surface/section of image generation unit
30p Surface, area, section image generation unit of image generation unit for imager panel/image generation
40 Projection unit
50 Display device, screen
60 Image generation element arrangement
61 Imager panel element, LCD-panel
62 Reflective arrangement, mirror
63 Color switching element
63-1 Quarter wave retarder
63-2 Reflective electronic color switch RECS
70 Polarizer
80 Polarization analyzer/filter
100 Conventional image projection device
300 Conventional image generation unit
300i Light input/incidence surface/section of conventional image generation unit
300o Light output/emission surface/section of conventional image generation unit
L1 Primary illumination light
L2 Secondary illumination light, image light
L3 Tertiary illumination light, projection light

The invention claimed is:

1. An image generation unit, comprising:
a light input section configured to receive primary illumination light from a first or light incidence direction;
an image generation element arrangement configured to produce an image by using the primary illumination light or a derivative of the primary illumination light and to generate secondary illumination light, the image generation element arrangement comprising an electronic switchable color filter and configured to transmit at least one first spectral component of incident light, to avoid transmission of a complementary spectral range of the at least one first spectral component, and to controllably switch a wavelength of the at least one first spectral component and the complementary spectral range of the at least one first spectral component; and
a light output section configured to emit the secondary illumination light or a derivative of the secondary illumination light as tertiary illumination light representative of an image in a second or image emission direction, wherein
the light input section and the light output section are arranged such that the first or light incidence direction and the second or image emission direction are collinear coincident with respect to each other, and
the respective collinearly and coincidence properties of the first and second directions with respect to each other are realized by a single optical folding element only.

2. An image generation unit according to claim 1, wherein the image generation element further comprises
a polarization selective beam splitting device as the single optical folding element and including a light input section serving as the light input or light incidence section of the image generation unit or as a part thereof, and a light output section serving as the light output or light emission section of the image generation unit or as a part thereof.

3. An image generation unit according to claim 2, wherein the polarization selective beam splitting device further comprises
a beam splitting cube including a first pair of opposing surfaces serving as the light input section of the polarization selective beam splitting device and as the light output section of the polarization selective beam splitting device.

4. An image generation unit according to claim 2, wherein the polarization selective beam splitting device further comprises
a polarization selective beam splitting interface configured to reflect light of a first polarization state and configured to transmit light of a second polarization state.

5. An image generation unit according to claim 2, wherein at least one element or part of the image generation element arrangement is positioned outside a path or passage defined by the first and second directions and the polarization selective beam splitting device or a polarization selective beam splitting interface of the polarization selective beam splitting device.

6. An image generation unit according to claim 1, wherein the image generation arrangement further comprises
a reflective imager panel element in an LCD-panel form configured to controllably generate an image.

7. An image generation unit according to claim 1, wherein the image generation element arrangement comprises a mirror configured to receive light reflected by a polarization selective beam splitting interface or a derivative thereof and to reflect the received light back, thereby changing its polarization state from p to s or from s to p, respectively.

8. An image generation unit according to claim 2, wherein the image generation element further comprises a quarter wave retarder.

9. An image generation unit according to claim 8, wherein an imager panel element and a reflective arrangement together with the electronic switchable color filter are configured at or in a pair of opposing sections of the image generation unit and of the polarization selective beam splitting device,
the pair of opposing sections being different from the light input or light incidence section and the light output or light emission section of the image generation unit, and
the pair of opposing sections being different from the light input section and the light output section of the polarization selective beam splitting device.

10. An image generation unit according to claim 9, wherein the pair of opposing sections of the image generation unit and of the polarization selective beam splitting device are oriented perpendicular to the light input or light incidence section and the light output or light emission section of the image generation unit and are oriented perpendicular to the light input section and the light output section of the polarization selective beam splitting device.

11. An image projection device, comprising:
an illumination unit configured to generate primary illumination light,
a projection unit configured to receive and project an image,
a light input section configured to receive the primary illumination light from a first or light incidence direction;
an image generation element arrangement configured to produce an image by using the primary illumination light or a derivative of the primary illumination light and to generate secondary illumination light, the image generation element arrangement comprising an electronic switchable color filter and configured to transmit at least one first spectral component of incident light, to avoid transmission of a complementary spectral range of the at least one first spectral component, and to controllably switch a wavelength of the at least one first spectral component and the complementary spectral range of the at least one first spectral component; and
a light output section configured to emit the secondary illumination light or a derivative of the secondary illumination light as tertiary illumination light representative of the image in a second or image emission direction, wherein
the light input section and the light output section are arranged such that the first or light incidence direction and the second or image emission direction are collinear coincident with respect to each other, and
the respective collinearly and coincidence properties of the first and second directions with respect to each other are realized by a single optical folding element only.

12. An image generation unit according to claim 1, wherein the electronic switchable color filter is configured to generate different colors in a time sequential mode.

13. An image generation unit, comprising:
a light input section configured to receive primary illumination light from a first or light incidence direction;
an image generation element arrangement configured to produce an image by using the primary illumination light or a derivative of the primary illumination light and to thereby generate secondary illumination light, the image generation element arrangement comprising a reflective electronic color switch that is configured to reflect a first color so as to have a turned polarization state, to reflect light having a color different from the first color in an unchanged polarization state, and to controllably switch a wavelength of the first color; and
a light output section configured to emit the secondary illumination light or a derivative of the secondary illumination light as tertiary illumination light representative of an image in a second or image emission direction, wherein
the light input section and the light output section are arranged such that the first or light incidence direction and the second or image emission direction are collinear coincident with respect to each other.

14. An image generation unit according to claim 1, wherein the image generation element further comprises
a polarization selective beam splitting device that passes light of a first polarization state and reflects light having a second polarization state,
the electronic switchable color filter configured to turn a polarization state of colors of light controllably in a time sequential manner,
a first polarization state reversing mirror that reflects and reverses a polarization state of light, and an imager panel arrangement including an LCD panel element and a second polarization state reversing mirror that reflects and reverses a polarization state of light, wherein
the electronic switchable color filter and the first polarization state reversing mirror, and the imager panel arrangement including the LCD panel element and the second polarization state reversing mirror are positioned at opposing sections of the image generation element.

* * * * *